United States Patent
Ruppel et al.

(10) Patent No.: US 12,254,647 B2
(45) Date of Patent: Mar. 18, 2025

(54) SECURE CAMERA BASED INERTIAL MEASUREMENT UNIT CALIBRATION FOR STATIONARY SYSTEMS

(71) Applicant: Aptiv Technologies AG, Schaffhausen (CH)

(72) Inventors: Christopher David Ruppel, Carmel, IN (US); Bradley Scott Coon, Russiaville, IN (US)

(73) Assignee: Aptiv Technologies AG, Schaffhausen (CH)

( * ) Notice: Subject to any disclaimer, the term of this patent is extended or adjusted under 35 U.S.C. 154(b) by 464 days.

(21) Appl. No.: 17/660,242

(22) Filed: Apr. 22, 2022

(65) Prior Publication Data

US 2023/0039129 A1  Feb. 9, 2023

Related U.S. Application Data

(60) Provisional application No. 63/229,177, filed on Aug. 4, 2021.

(51) Int. Cl.
*G06T 7/70* (2017.01)
*G01C 25/00* (2006.01)
(Continued)

(52) U.S. Cl.
CPC .............. *G06T 7/70* (2017.01); *G01C 25/005* (2013.01); *G06T 7/97* (2017.01); *B60W 50/0205* (2013.01);
(Continued)

(58) Field of Classification Search
CPC ... G06T 7/70; G06T 7/97; G06T 2207/30252; G06T 2207/30208; G06T 7/80;
(Continued)

(56) References Cited

U.S. PATENT DOCUMENTS 11,538,188 B1 * 12/2022 Cejka ....................... G06T 7/80
12,033,434 B1 *  7/2024 Doke ..................... H04N 23/61
(Continued)

FOREIGN PATENT DOCUMENTS

EP      3158293 B1    1/2019

OTHER PUBLICATIONS

Marco, et al., "A Novel IMU Extrinsic Calibration Method for Mass Production Land Vehicles", Dec. 22, 2020, 30 pages.
(Continued)

*Primary Examiner* — Idowu O Osifade
*Assistant Examiner* — Ahmed A Nasher
(74) *Attorney, Agent, or Firm* — Harness, Dickey & Pierce, P.L.C.

(57) ABSTRACT

Described are techniques and systems for secure camera based IMU calibration for stationary systems, including vehicles. Existing vehicle camera systems are employed, with enhanced security to prevent malicious attempts by hackers to try and cause a vehicle to enter IMU calibration mode. IMU calibration occurs when a calibration system determines the vehicle is parked in a controlled environment; calibration targets are positioned at different viewing angles to vehicle cameras to act as sources of optical patterns of encoded data. Features of the patterns are for security as well as for alignment functionality. Images of the calibration targets enable inference of a vehicle coordinate system, from which calculations for IMU mounting error compensations are performed. A relative rotation between the IMU and the vehicle coordinate system are applied to IMU data to compensate for relative rotations between the vehicle and the IMU, thereby improving vehicle slope and bank metrics.

20 Claims, 4 Drawing Sheets

(51) Int. Cl.
  *G06T 7/00*     (2017.01)
  *B60W 50/02*    (2012.01)
(52) U.S. Cl.
  CPC ............ *B60W 2050/0215* (2013.01); *G06T 2207/30252* (2013.01)
(58) Field of Classification Search
  CPC ............ G06T 2207/30264; G06T 7/85; G01C 25/005; G01C 21/183; B60W 50/0205; B60W 2050/0215; B60R 2300/105; B60R 2300/303; B60R 1/27; G06V 10/245; G06V 20/56
  See application file for complete search history.

(56) References Cited

U.S. PATENT DOCUMENTS

| | | | |
|---|---|---|---|
| 2014/0247354 A1* | 9/2014 | Knudsen | G06T 7/85 348/148 |
| 2019/0204427 A1 | 7/2019 | Abari et al. | |
| 2021/0134079 A1 | 5/2021 | Nee | |
| 2021/0407130 A1* | 12/2021 | Qian | G06T 7/521 |

OTHER PUBLICATIONS

"Extended European Search Report", EP Application No. 22171782.0, Nov. 23, 2022, 5 pages.

\* cited by examiner

SECURE CAMERA BASED INERTIAL MEASUREMENT UNIT CALIBRATION FOR STATIONARY SYSTEMS

CROSS-REFERENCE TO RELATED APPLICATION

This application claims the benefit of U.S. Provisional Patent Application No. 63/229,177, filed Aug. 4, 2021, which is incorporated by reference herein in its entirety.

BACKGROUND

Vehicle guidance systems often rely on inertial measurement unit (IMU) technology for determining vehicle orientation or movement. Careful positioning of an IMU ensures correct operability. An original equipment manufacturer (OEM) may specify an IMU mounting accuracy to be within one half a degree of a vehicle-body coordinate system, which allows IMU data to be compatible for functions of the vehicle. Existing manufacturing techniques (e.g., soldering) have coplanarity limits when applied to IMU mounting on a printed circuit board (PCB). Slight mounting errors in a vehicle IMU installation may induce significant errors in IMU data, which can impact vehicle performance including causing uncomfortable or unsafe maneuvering.

SUMMARY

This document describes techniques and systems for secure camera based IMU calibration for stationary systems, including vehicles. Existing vehicle camera systems are employed, with enhanced security to prevent malicious attempts by hackers to try and cause a vehicle to enter IMU calibration mode. IMU calibration occurs when a calibration system determines the vehicle is parked in a controlled environment; calibration targets are positioned at different viewing angles to vehicle cameras to act as sources of optical patterns of encoded data. Features of the patterns are for security as well as for alignment functionality. Images of the calibration targets enable inference of a vehicle coordinate system, from which calculations for IMU mounting error compensations are performed. A relative rotation between the IMU and the vehicle coordinate system are applied to IMU data to compensate for relative rotations between the vehicle and the IMU, thereby improving vehicle slope and bank metrics.

In one example, a method includes receiving, from a first camera of a stationary vehicle, an image of a first calibration target within a first camera field of view of the first camera, and receiving, from a second camera of the stationary vehicle, an image of a second calibration target within a second camera field of view of the second camera. The second camera field of view is opposite the first camera field of view. The method further includes determining, based on data encoded in the image of the first calibration target and data encoded in the image of the second calibration target, whether the first and second calibration targets are valid for calibrating an inertial measurement unit (IMU) of the stationary vehicle, and responsive to determining that the first and second calibration targets are valid for calibrating the IMU, establishing, based on the image of the first calibration target and the image of the second calibration target, a vehicle coordinate system with respect to ground-truth conditions outside the vehicle. The method further includes outputting information to enable the stationary vehicle to compensate for IMU mounting errors in the vehicle by calibrating the IMU to align IMU data output from the IMU with the vehicle coordinate system.

These and other described techniques may be performed by hardware or a combination of hardware and software executing thereon. For example, a computer-readable storage media (CRM) may have instructions stored thereon and that when executed configure a processor to perform the described techniques. A system may include means for performing the described techniques. A processor or processor unit may be part of a system that is configured to execute the methods and techniques described herein.

Through implementation of these and other examples contemplated by this disclosure, secure and accurate IMU calibration can be achieved to eliminate IMU mounting irregularities, for example, in vehicles (e.g., trucks, automobiles), as further made clear from the Detailed Description and Drawings. This Summary introduces simplified concepts for secure camera based IMU calibration for stationary systems. This Summary is not intended to identify essential features of the claimed subject matter, nor is it intended for use in determining the scope of the claimed subject matter.

BRIEF DESCRIPTION OF THE DRAWINGS

The details of secure camera based IMU calibration for stationary systems is described in this document with reference to the Drawings that may use same numbers to reference like features and components, and hyphenated numbers to designate variations of these like features and components. The Drawings are organized as follows.

DETAILED DESCRIPTION

IMU data may be used to enable some vehicle functions. IMU positional mountings are specified with great precision to ensure alignment with a vehicle coordinate system. Accurate IMU data is particularly important to enable safe autonomous and semi-autonomous driving, as well as to provide reliable active safety features. Because even a slight mounting error in a vehicle IMU installation can induce significant errors in IMU data, IMU calibration may be needed after installation in and among other parts of the vehicle.

Some existing techniques enable IMU calibration when a vehicle is under motion. However, these techniques are complex, rely on expensive computers, are time consuming, and may even make a vehicle inoperable at times, for instance, when waiting until an IMU calibration can be derived. These techniques are of limited use for removing mounting errors between the IMU and the vehicle coordinate system.

Still some other techniques enable IMU calibration when a vehicle is stationary and not moving. Vehicles often include camera systems having multiple cameras. Images captured by a camera system are used to calibrate the IMU;

however, this form of calibration has security concerns. Existing camera based IMU calibration techniques are susceptible to hackers. Vehicle cameras can be fooled when calibration targets are spoofed outside the parked vehicle. If the IMU calibration of a vehicle is hacked and the IMU calibrated differently, autonomous, or semi-autonomous controls may malfunction, resulting in erratic or unsafe vehicle behavior.

Overview

Described are techniques and systems for secure camera based IMU calibration for stationary systems, including vehicles. Existing vehicle camera installations are employed for stationary IMU calibration with enhanced security. Rather than be performed whenever the vehicle is parked, this calibration occurs only when the vehicle is parked in a controlled calibration environment (e.g., at a vehicle factory, a vehicle service facility, or other controlled environment) where secure vehicle data (e.g., IMU calibration mappings) of the parked vehicle, which includes an IMU mounted to a PCB assembly, is accessible.

To prevent malicious attempts by hackers to try and cause the vehicle to enter an IMU calibration mode, IMU calibration is restricted to being executed by a computer either within the vehicle itself, or with access to the vehicle and the calibration environment. For example, a consumer is not allowed to recalibrate the IMU of their vehicle in their own garage. Special equipment acts as a calibration system and is required to communicate with components of the vehicle to align the IMU with the vehicle coordinate system.

Within the controlled environment, calibration targets are positioned outside the vehicle, at different viewing angles to the existing camera system of the vehicle. The calibration targets can include computer-controlled sources of optical patterns, which are sensed by the cameras of the vehicle. For example, each camera has a corresponding, well-calibrated, optical liquid crystal display (LCD) screen placed near it. For enhanced security, however, the generated optical patterns may each be encoded in a manner that specifically prevents spoofing attempts (e.g., in the event of an IMU calibration hack). The calibration targets may enable the vehicle to keep certain functions and information (e.g., IMU calibrations) uniquely privileged to certain vehicle-serial numbers, certain vehicle service facilities, and the like. This can be in addition to other identifying or encoded features that can be embedded in the optical patterns captured by the vehicle cameras.

The camera system includes at least two cameras, which are generally mounted at different locations and heights; additional cameras can improve calibration results. The cameras themselves are well-spaced apart on the vehicle. At least a first camera (e.g., a front-facing camera) has a field of view that projects from a first side of the vehicle (e.g., the front end). At least a second camera (e.g., a rear-facing camera) has an opposite field of view, which projects from a second side of the vehicle (e.g., the rear end) that is opposite the first side. From collecting images from two or more cameras located at opposing parts, sides, or ends of the vehicle, precise checking and compensation of mounting errors associated with an IMU are performed.

The calibration system obtains respective heights of the cameras (e.g., from a vehicle controller). These respective heights are used by the calibration system to ascertain a vehicle coordinate system with respect to ground-truth conditions. This works even when tire-inflations or other vehicle components cause the vehicle coordinate system to be imperfect. Variations between the IMU coordinate system and the true, vehicle coordinate system can be applied to IMU data as it is generated to compensate for relative rotations that exists directly between the vehicle and the IMU. The compensation aligns the IMU data with the vehicle coordinate system, irrespective of irregularities in alignment between either the IMU or the vehicle coordinate system and the ground-truth conditions. Accuracy of vehicle metrics derived from IMU readings, such as vehicle slope and bank, are improved. As one example, an IMU mounting calibration at one half degree precision is achievable on a four meter long vehicle when two opposing (e.g., front and rear) cameras are selected, which have a small relative height difference. For example, the relative height difference can be approximately 34.9 millimeters as computed from multiplying four meters by the tangent of one half degree.

These calibration techniques can be part of a robust overall adaptive sensing system, which can then automatically handle specific changes to camera positions based on other, detailed-vehicle information (e.g., changing tire pressures). However, this detailed-vehicle information at the time of a camera-check is not needed for calibrating the IMU to compensate for vehicle mounting errors, in accordance with the described techniques.

Example Environment

Figure 1:
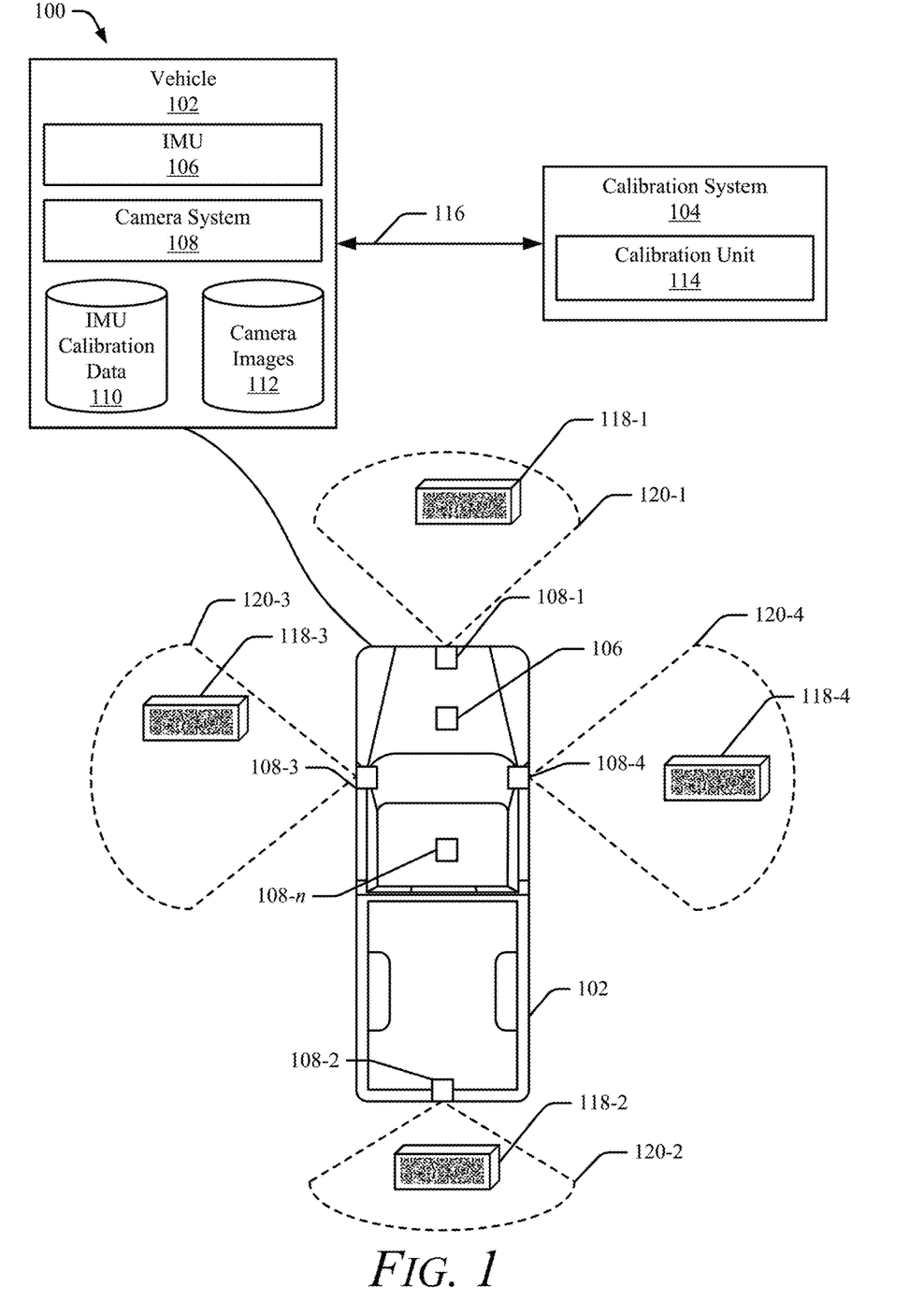
FIG. 1 illustrates a conceptual diagram of an example environment for secure camera based IMU calibration for stationary systems.

FIG. 1 illustrates a conceptual diagram of an example environment 100 for secure camera based IMU calibration for stationary systems. The environment 100 includes a vehicle 102 that is undergoing IMU mounting calibration by a calibration system 104. The environment 100 represents a controlled environment, such as a vehicle factory or vehicle service station, where components of the vehicle 102 are initialized to an original baseline of settings or are reprogrammed with official updates to the initial settings. Although illustrated as a passenger truck, the vehicle 102 can represent other types of vehicles including other types of road vehicles (e.g., a car, motorcycle, bus, tractor, semi-trailer truck), railed vehicles (e.g., a train), watercraft (e.g., a boat), aircraft (e.g., an airplane), spacecraft (e.g., satellite), and the like.

The vehicle 102 includes an IMU 106 and a camera system 108. The IMU 106 generates IMU data, which is compensated with IMU calibration data 110 that has been produced by analyzing camera images 112 captured by at least two cameras of the camera system 108. For ease of description, the IMU 106 is described as being a single IMU. Often times, the vehicle 102 includes multiple IMUs. The IMU 106 may include more than one IMU, each positioned at different locations on the vehicle 102 to obtain precise IMU data for different vehicle regions. Likewise, multiple IMUs of the IMU 106 may be positioned at same locations of the vehicle 102, for increased safety, e.g., providing redundancy in the IMU data generated on-vehicle.

The camera system 108 is used by the vehicle 102 for detecting objects from the camera images 112 that are present on or near a roadway that can impact how or whether the vehicle 102 can continue to travel or park. Each camera of the camera system 108 is configured to capture images for a particular region of interest at least partially surrounding the vehicle 102, which is referred to as a field of view. To obtain the desired field of view, components of the camera system 108 can be installed on, mounted to, or integrated with any part of the vehicle 102, such as in a front, back, top, bottom, corner, or side portion of the vehicle 102, a bumper, a side mirror, part of a headlight and/or taillight, a tailgate, a trunk lid, or at any other exterior facing location of the vehicle 102.

The camera system 108 includes a camera 108-1, a camera 108-2, a camera 108-3, a camera 108-4, and a camera 108-*n*. The camera 108-1 is a first end (e.g., front end) facing camera of the vehicle 102, and the camera 108-2 is a second, opposite end (e.g., rear end) facing camera of the vehicle 102. The camera 108-3 is a first side (e.g., driver side) facing camera of the vehicle 102, and the camera 108-4 is a second, opposite side (e.g., passenger side) facing camera of the vehicle 102. The camera 108-*n* is a center positioned camera of the vehicle 102. In other examples, the cameras 108-1 and 108-2 or the cameras 108-3 and 108-4 are corner cameras placed at different corner positions of the vehicle 102. In some examples, the camera 108-1 and the camera 108-2 are positioned at opposite corners of the vehicle 102. Likewise, the camera 108-3 and the camera 108-4 may be positioned at different, opposite, corners. For purposes of this disclosure, opposite corners refers to a combination of front passenger side and rear driver side corners of the vehicle 102 or a combination of front driver side and rear passenger side corners of the vehicle 102. Opposite sides include a combination of front and rear ends or passenger and driver sides of the vehicle 102.

The camera 108-1 is configured to provide a field of view 120-1, the camera 108-2 is configured to provide a field of view 120-2, and so on, with the camera 108-*n* configured to provide a field of view 120-*n* (not shown). The camera system 108 can have more than five cameras or fewer cameras.

In addition to detecting objects for facilitating driving functions, the camera system 108 can be used to calibrate the IMU 106, e.g., to compensate for mounting errors that misalign the IMU 106 with respect to a vehicle coordinate system of the vehicle 102. However, careful selection of cameras to be used for capturing the camera images 112 is needed. To generate the camera images 112 sufficient for generating the IMU calibration data 110, the camera system 108 includes at least two cameras with opposing field of views. Opposing field of views are considered to be field of views that project from cameras positioned at opposite sides or opposite corners of the vehicle 102. For example, the camera 108-1 and the camera 108-2 project opposing field of views in that the field of view 120-1 projects in front of the vehicle 102 and the field of view 120-2 projects out the rear end of the vehicle 102. Other considerations in selecting the cameras for the camera system 108 to allow the IMU calibration data 110 to be computed include choosing cameras that have a minimum separation distance and/or a maximum separation height between them. This is described in greater detail in view of the other FIGS. 2-4.

The camera system 108 can include its own computer hardware or may be at least partially controlled by computer hardware of the vehicle 102, which can be same or different than vehicle components that control the IMU 106. For simplicity of the drawings, these components are not shown in the drawings. However, the vehicle 102 includes computer hardware (e.g., a controller, a control unit, a processor, programmable logic) configured to control the camera system 108 and the IMU 106 in a coordinated manner to capture and manage the camera images 112 stored on the vehicle 102. The IMU calibration data 110 may be stored by the vehicle 102 in a different CRM than the camera images 112. The vehicle 102 can maintain the camera images 112 and the IMU calibration data 110 on the same CRM, in other examples. The computer hardware of the vehicle 102 can calibrate the IMU 106 with the IMU calibration data 110 after the IMU calibration data 110 is generated based on the camera images 112.

The vehicle 102 may include hardware or logic to generate the IMU calibration data 110 on the vehicle 102. However, in the example of FIG. 1, the IMU calibration data 110 is generated offline (e.g., outside the vehicle 102 computer hardware) using different hardware within the environment 100. Computer hardware of the calibration system 104 is configured to obtain the camera images 112 from the vehicle 102 and generate the IMU calibration data 110 that it sends back to the vehicle 102 enabling the computer hardware of the vehicle 102 to calibrate the IMU 106.

The IMU 106 can produce IMU data, and the IMU calibration data 110 can be used by the computer hardware of the vehicle 102 to compensate the IMU data before being output for use by vehicle functions. To this end, the computer hardware of the vehicle 102 can execute operations that cause the generation of IMU data, which is closely aligned to a vehicle coordinate system of the vehicle 102, thereby preventing any mounting errors associated with the IMU 106 from corrupting the IMU data. Compensated IMU data from the IMU 106 is output ready for use in performing other functions of the vehicle 102.

The calibration system 104 includes a calibration unit 114, a communication link 116, and a plurality of calibration targets 118. The communication link 116 enables transmission of data between computer hardware of the vehicle 102 and the calibration system 104. The communication link 116 may be wired or wireless. The communication link 116 may be a secure link utilizing encryption and authentication techniques that prevent malicious access to the vehicle 102 and/or to the calibration system 104. With the communication link 116 established, the vehicle 102 can send the camera images 112 captured with the camera system 108, and in response, receive the IMU calibration data 110 generated by the calibration system 104.

The calibration targets 118 are shown as calibration target 118-1, calibration target 118-2, calibration target 118-3, and calibration target 118-4. Each of the calibration targets 118 is placed in a field of view of a different camera of the camera system 108. The calibration target 118-1 is in the field of view 120-1, the calibration target 118-2 is positioned in the field of view 120-2, the calibration target 118-3 is positioned in the field of view 120-3, and the calibration target 118-4 is positioned in the field of view 120-4. Each of the calibration targets 118 is configured to display content, including optically encoded data, which enables recalibration of the IMU 106. The content is displayed by each of the calibration targets 118 at a precise position relative the vehicle 102 and the cameras of the camera system 108. This allows alignment markers within the encoded data to be used for determining the vehicle coordinate system from the camera images 112.

In addition, the encoded data prevents spoofing of the calibration targets 118 and further prevents the calibration system 104 from incorrectly generating the IMU calibration data 110 for a wrong type (e.g., make, model, year, serial number, vehicle identification number) of the vehicle 102 and/or the IMU 106. For example, if features of the encoded data are unrecognizable from the camera images 112 captured of the calibration targets 118, the calibration system 104 may refrain from communicating with the vehicle 102 and not generate the IMU calibration data 110.

The calibration unit 114 of the calibration system 104 controls the content presented on the calibration targets 118 and generates the IMU calibration data 110 from the camera images 112 of the content. For example, the calibration unit 114 is configured to receive the camera images 112 of the calibration targets 118 captured by the camera system 108. Based on the camera images 112 received via the communication link 116, the calibration unit 114 is configured to determine a realignment of a coordinate system of the IMU 106. For example, the realignment includes rotational corrections to axis of the IMU coordinate system to bring a frame of reference of the IMU 106 into agreement with that of the vehicle 102. The calibration unit 114 causes the IMU calibration data 110 to be conveyed to the IMU 106 over the communication link 116. This causes a realignment to a coordinate system of the IMU 106 such that future IMU data generated by the IMU 106 is in precise alignment with the coordinate system of the vehicle 102 even when the vehicle 102 leaves the controlled conditions of the environment 100 (e.g., parked on a road).

Example Calibration Unit

Figure 2:
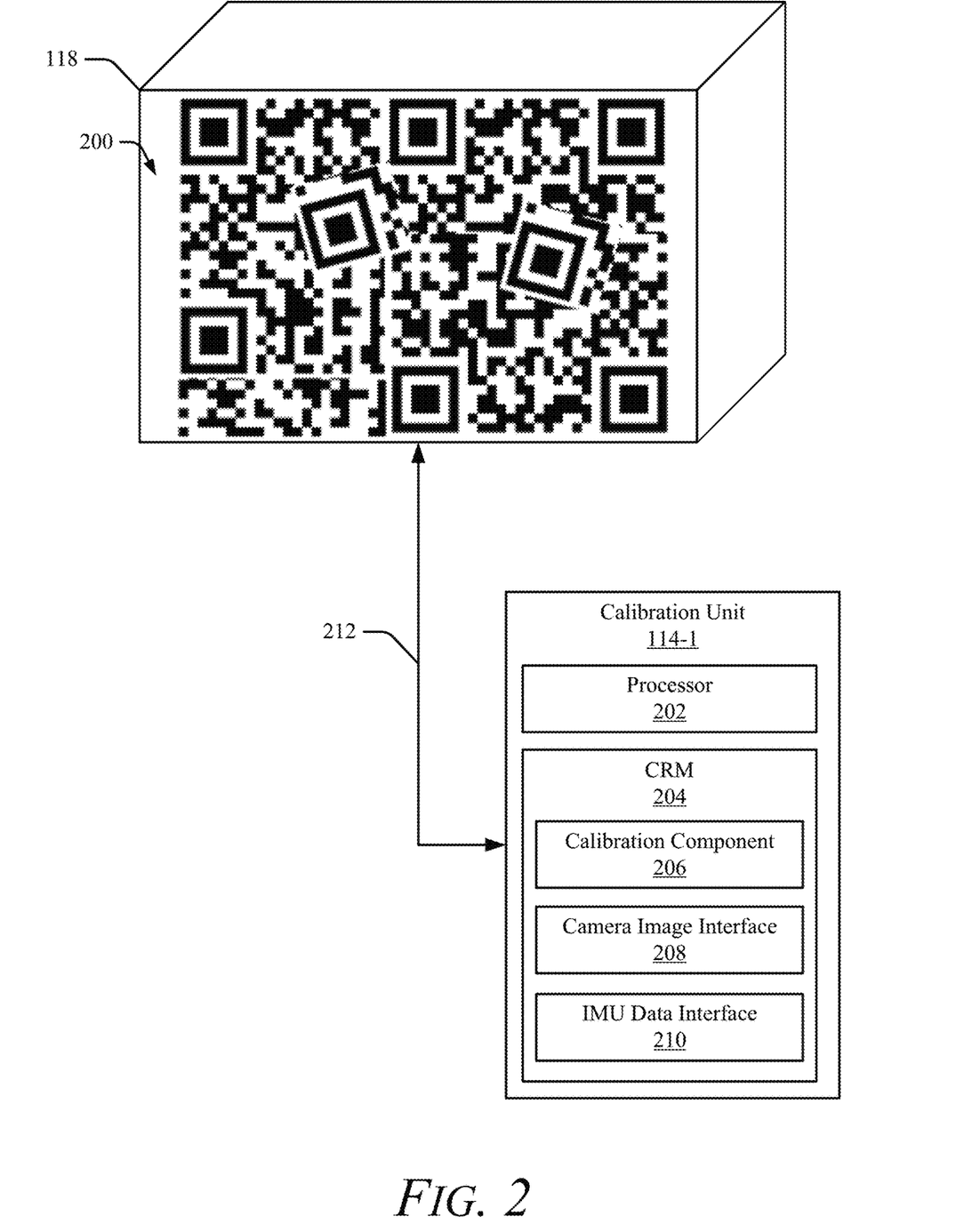
FIG. 2 illustrates a conceptual diagram of a calibration unit configured to perform secure camera based IMU calibration for stationary systems.

FIG. 2 illustrates a conceptual diagram of a calibration unit 114-1 configured to perform secure camera based IMU calibration for stationary systems. The calibration unit 114-1 is an example of the calibration unit 114 and is described in the context of FIG. 1. For example, the calibration unit 114-1 is shown operatively and communicatively coupled to at least two of the calibration targets 118, each having its own respective screen 200 for displaying graphical or other optically recognizable content. When connected to more than two of the calibration targets 118, the calibration unit 114-1 obtains sufficient information from content on the screens 200 to improve calculations (e.g., vehicle metrics) inferred using the IMU 106. For example, with at least three carefully positioned calibration targets 118, or at least three images 112 of respective screens 200 of two different carefully positioned calibration targets 118, both, vehicle slope and vehicle bank calculations can be improved.

The calibration unit 114-1 includes a processor 202 and a CRM 204. The CRM 204 stores instructions and/or data, that when executed by the processor 202, implements a calibration component 206, a camera image interface 208, and an IMU data interface 210. The calibration unit 114-1 shares a communication link 212 with each of the calibration targets 118.

The camera image interface 208 configures the calibration unit 114-1 to receive images of the calibration targets 118 as they appear in two opposing field of views of at least two cameras from the camera system 108. For example, via the communication link 116, the camera image interface 208 receives one of the camera images 112 captured by the camera 108-1 that is of the calibration target 118-1 within the field of view 120-1. In addition, as captured by the camera 108-2, the camera image interface 208 receives at least one more of the camera images 112, which is an image of the calibration target 118-2 within the field of view 120-2, which is opposite the field of view 120-1. Similarly, the camera image interface 208 can receive images of the other calibration targets 118, as they appear in images captured by the cameras 108-3 and 108-4, as the calibration targets 118-3 and 118-4 appear, respectively, in the field of views 120-3 and 120-4.

The IMU data interface 210 configures the calibration unit 114-1 to send the IMU calibration data 110 to the vehicle 102 over the communication link 116. For example, the calibration component 206 generates the IMU calibration data 110 based on the camera images 112 received at the camera image interface 208. The IMU calibration data 110 is transmitted by the IMU data interface 210 to the vehicle 102 for use in compensating IMU data produced from the IMU 106.

The calibration component 206 is responsible for generating the IMU calibration data 110 to fill an output buffer of the IMU data interface 210 based on information analyzed from an input buffer of the camera image interface 208. To generate the IMU calibration data 110, the calibration component 206 selects certain cameras to be used for IMU mounting calibration, causes certain content to be displayed in their respective fields of view, and, based on data encoded in the camera images 112 taken of the calibration targets 118, precisely aligns the IMU 106 to the vehicle coordinate system of the vehicle 102.

To choose the cameras of the camera system 108, the calibration component 206 obtains information about position, viewing angle, and field of view size, of each camera of the camera system 108 to identify suitable pairs of cameras with opposing or opposite field of views. Not all cameras of the camera system 108 may be suitable pairings; a minimum height-similarity between the two cameras may be used to ensure that, because of trigonometry math, their relative positioning can satisfactorily resolve a small mounting error (e.g., angle error) in the IMU 106. For instance, the calibration component 206 can obtain a relative separation height between the camera 108-1 and the camera 108-2. The calibration component 206 can obtain a relative separation distance between the camera 108-1 and the camera 108-2, as well. If the cameras 108-1 and 108-2 are too close in separation distance (e.g., not on opposite sides, not on opposite corners, not on opposite ends) on the vehicle 102, they may not be suitable for calibrating the IMU 106 for improving vehicle bank and roll computations. Likewise, if the cameras 108-1 and 108-2 are too far apart in height relative the vehicle coordinate system, they may not be suitable for calibrating the IMU 106 for improving vehicle bank and roll computations. However, if sufficiently far apart in distance, and sufficiently close in height, the cameras 108-1 and 108-2 may be selected for calibration for improving vehicle bank and roll computations of the IMU 106. That is, the calibration component 206 may select, from among multiple different cameras 108-1 to 108-$n$ of the vehicle 102, the camera 108-1 and the camera 108-2 to use for calibrating the IMU 106 based on whether the relative separation height between the camera 108-1 and the camera 108-2 satisfies a height threshold (e.g., less than one hundredth of a meter). In addition, or alternatively, the calibration component 206 may select, from among multiple different cameras 108-1 to 108-$n$ of the vehicle 102, the camera 108-1 and the camera 108-2 to use for calibrating the IMU based on whether the relative separation distance between the camera 108-1 and the camera 108-2 satisfies a distance threshold (e.g., more than several meters).

The calibration component 206 communicates with the calibration targets 118 to display content on the respective screens 200, which appear in the field of views 120 of the selected cameras from the camera system 108 and in the camera images 112. The calibration component 206 controls the presentation and format of the content displayed at each calibration target 118. Each of the respective screens 200 can display the same, similar, or different content. The calibration component 206 may output, for display on a respective screen 200 of the calibration target 118-1, a first optical pattern. The calibration component 206 may output, for display on a respective screen 200 of the calibration target 118-2, a second optical pattern. The optical patterns may be different from one calibration target 118 to the next, however, each may include a portion of encoded data. When captured by the cameras 108-1 and 108-2 and/or 108-3 and 108-4, the encoded data appears in pixels of the camera images 112.

The encoded data serves multiple purposes. A comparison of the expected encoded data with the detected encoded data in the camera images 112 activates or conditions the IMU

106 calibration. In addition, the encoded data is used as alignment features to generate the IMU calibration data 110 to calibrate the IMU 106. As such, the content that appears on the respective screens 200 of the calibration targets 118 provides a security purpose to prevent unintentional or malicious calibrations, as well as a functional purpose for calibrating the IMU 106.

For example, illustrated as a seemingly random pattern of shapes on the respective screens 200, the calibration targets 118 can be controlled by the calibration component to display content like that shown in FIG. 2. Included in this optical pattern example is encoded data, including reference alignment regions interspersed with embedded security features, including extra regions of noise. The alignment regions can be used to generate the IMU calibration data 110. The optical pattern may be displayed or projected by the calibration targets 118 on a plane that is perpendicular to horizontal plane that includes the vehicle 102 and one of the cameras 108-1, 108-2, . . . , and so forth. This can optimize the detection of vehicle bank and roll angles during the vehicle coordinate system and the IMU coordinate system alignment and the IMU 106 calibration. The embedded security features can be used to authenticate the underlying calibration being performed. For instance, an embedded key can be presented by the calibration target 118 to use as a public key for authenticating and verifying that the calibration process is allowed to execute. In some examples, a barcode or QR code can indicate a secure website or internet protocol (IP) address for allowing bidirectional communication between the calibration component 206 and the vehicle 102. Additional security measures can include changing the calibration targets 118, periodically, to further prevent unauthorized reprogramming or calibration of the IMU 106. This ensures the IMU 106 is not recalibrated unless the calibration component 206 can validate certain parameters are verifiable from the camera images 112. In this way, the calibration component 206 is less likely to be compromised by a spoofing attack that tries to mimic the encoded data on false calibration targets positioned around the vehicle 102, e.g., when the vehicle 102 is parked outside the environment 100.

Example Calibration Component

Figure 3:
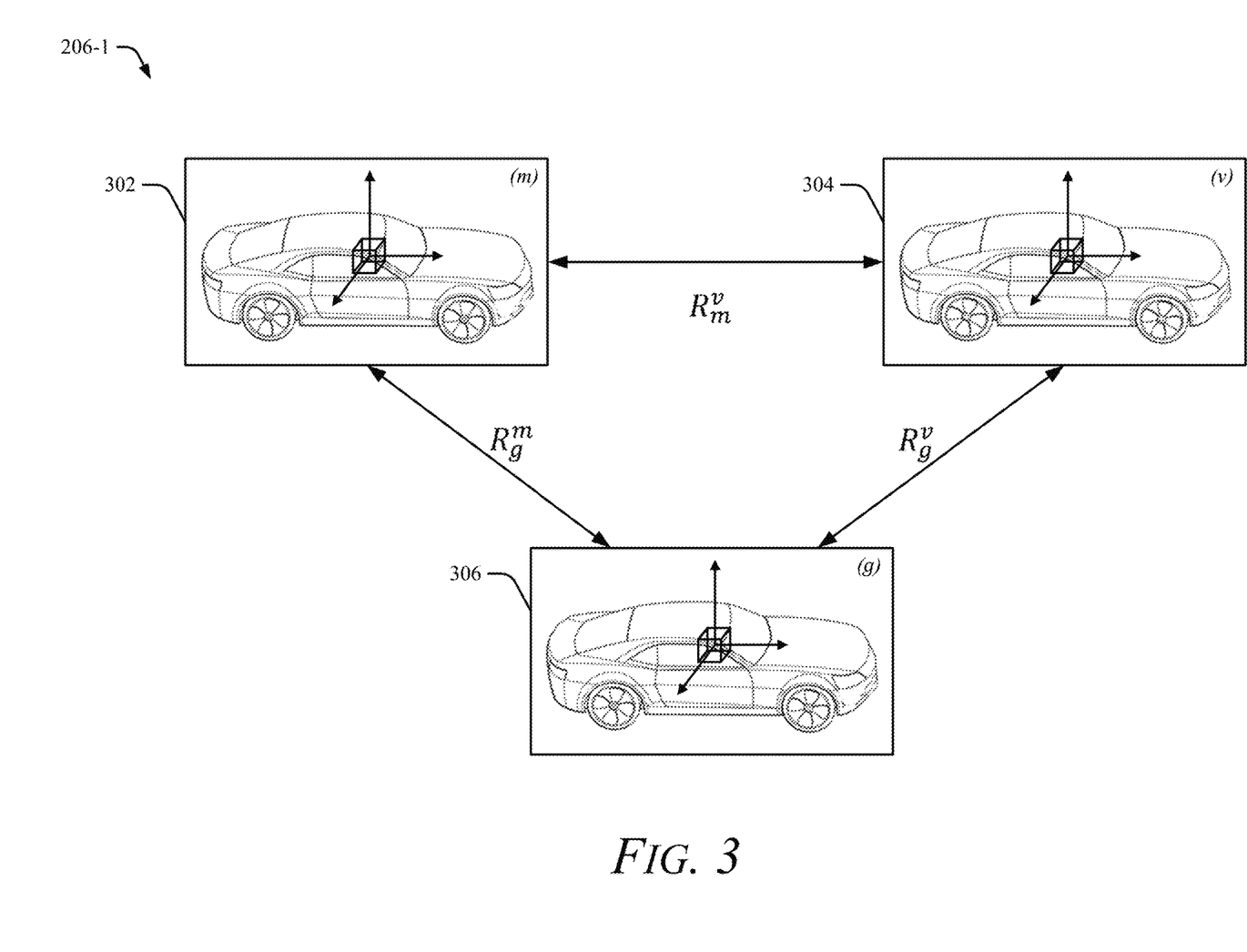
FIG. 3 illustrates a conceptual diagram of a calibration component configured to perform secure camera based IMU calibration for stationary systems.

FIG. 3 illustrates a conceptual diagram of a calibration component 206-1 configured to perform secure camera based IMU calibration for stationary systems. The calibration component 206-1 is an example of the calibration component 206 and described in the context of FIGS. 1 and 2. The calibration component 206-1 is configured to compensate for IMU mounting errors in the vehicle 102 by generating the IMU calibration data 110 to calibrate the IMU 106.

In continuing the example from FIG. 2, responsive to receiving the camera images 112 of the calibration targets 118-1 and 118-2 and/or 118-3 and 118-4, the calibration component 206-1 checks whether to continue or refrain from generating the IMU calibration data 110. Based on data encoded in the image of the calibration target 118-1 and data encoded in the image of the calibration target 118-2, it is determined whether the calibration targets 118-1 and 118-2 are valid for calibrating the IMU 106 of the vehicle 102. Responsive to determining that the calibration targets 118-1 and 118-2 are not valid for calibrating the IMU 106 (e.g., one of more of the camera images 112 does not include the encoded data the calibration component 206-1 expects to see), the calibration component 206-1 refrains from executing a function to generate the IMU calibration data 110. Otherwise, e.g., responsive to validating the calibration targets 118-1 and 118-2 from the camera images 112, the calibration component 206-1 calls on the function to generate the IMU calibration data 110.

The IMU calibration data 110 is generated by the calibration component 206-1 to remove relative rotation between an IMU coordinate system 302 and a vehicle coordinate system 304, irrespective of ground-truth conditions 306 of the environment 100. The IMU calibration data 110 can include adjustments to parameters of the IMU 106 to rotationally align the IMU coordinate system 302 with the vehicle coordinate system 304 after isolating relative rotations that each has to the ground-truth conditions 306 (e.g., a gravity vector).

The ground-truth conditions 306 includes the true gravitational vector for the environment 100, for instance, as measured by a highly calibrated IMU located in the environment 100 outside the vehicle 102, and operatively coupled to the calibration component 206-1. The ground-truth conditions 306 may be obtained by the calibration component 206-1 in one or more ways (e.g., from input by a technician, from input from a file about the environment 100, from other equipment in the environment 100 or the calibration system 104).

The calibration component 206-1 obtains IMU data from the IMU 106 as a frame of reference to determine the IMU coordinate system 302 with respect to the ground-truth conditions 306. Based on the image of the calibration target 118-1 and the image of the calibration target 118-2, the vehicle coordinate system 304 is likewise established with respect to the ground-truth conditions 306. By comparing the vehicle coordinate system 304 to the IMU coordinate system 302, a relative rotation between the two coordinate systems 304 and 302 can be computed, which is isolated from the influence of the ground-truth conditions 306. For example, a first relative rotation $R_g^m$ between the IMU coordinate system 302 (*m*) and the ground-truth conditions 306 (*g*) is computed. Likewise, a second relative rotation $R_g^v$ between the vehicle coordinate system 304 (*v*) and the ground-truth conditions 306 (*g*) is computed. Based on the first relative rotation $R_g^m$ and the second relative rotation $R_g^v$, a third relative rotation $R_m^v$ between just the vehicle coordinate system 304 (*v*) and the IMU coordinate system 302 (*m*) is computed. This third relative rotation $R_m^v$ removes the relative rotation influence of the ground-truth conditions 306 (*g*) and indicates a relative rotation between axis of the IMU coordinate system 302 and axis the vehicle coordinate system 304 alone. The IMU calibration data 110 is determined by determining adjustments to the parameters of the IMU 106 that reduce this third relative rotation between the IMU coordinate system 302 and the vehicle coordinate system 304 as much as possible, or at least, to within an acceptable level of tolerance, such as one half degree in any direction.

The IMU calibration data 110 is provided to the vehicle 102 to allow the vehicle 102 to align IMU data output from the IMU 106 for use by functions that are aligned with the vehicle coordinate system 304. Using the IMU data interface 210, the calibration component 206-1 can cause the calibration system 104 to transmit the IMU calibration data 110 to the vehicle 102 over the communication link 116. The IMU calibration data 110 indicates how to compensate IMU data to align the IMU coordinate system 302 of the IMU 106 with the vehicle coordinate system 304 of the vehicle 102, which can effectively prevent erroneous IMU data caused by mounting errors in the installation of parts of the vehicle 102 and/or the IMU 106. The computer hardware of the vehicle 102 can reprogram settings and parameters of the IMU 106 to compensate for IMU mounting errors by calibrating the IMU 106 using the IMU calibration data 110. After the IMU data is aligned to the vehicle coordinate system 304 and compensated for the IMU mounting errors in the vehicle 102, the vehicle 102 may use the IMU data output from the IMU 106 for executing vehicle functions that act on the IMU data.

Example Calibration Process

Figure 4:
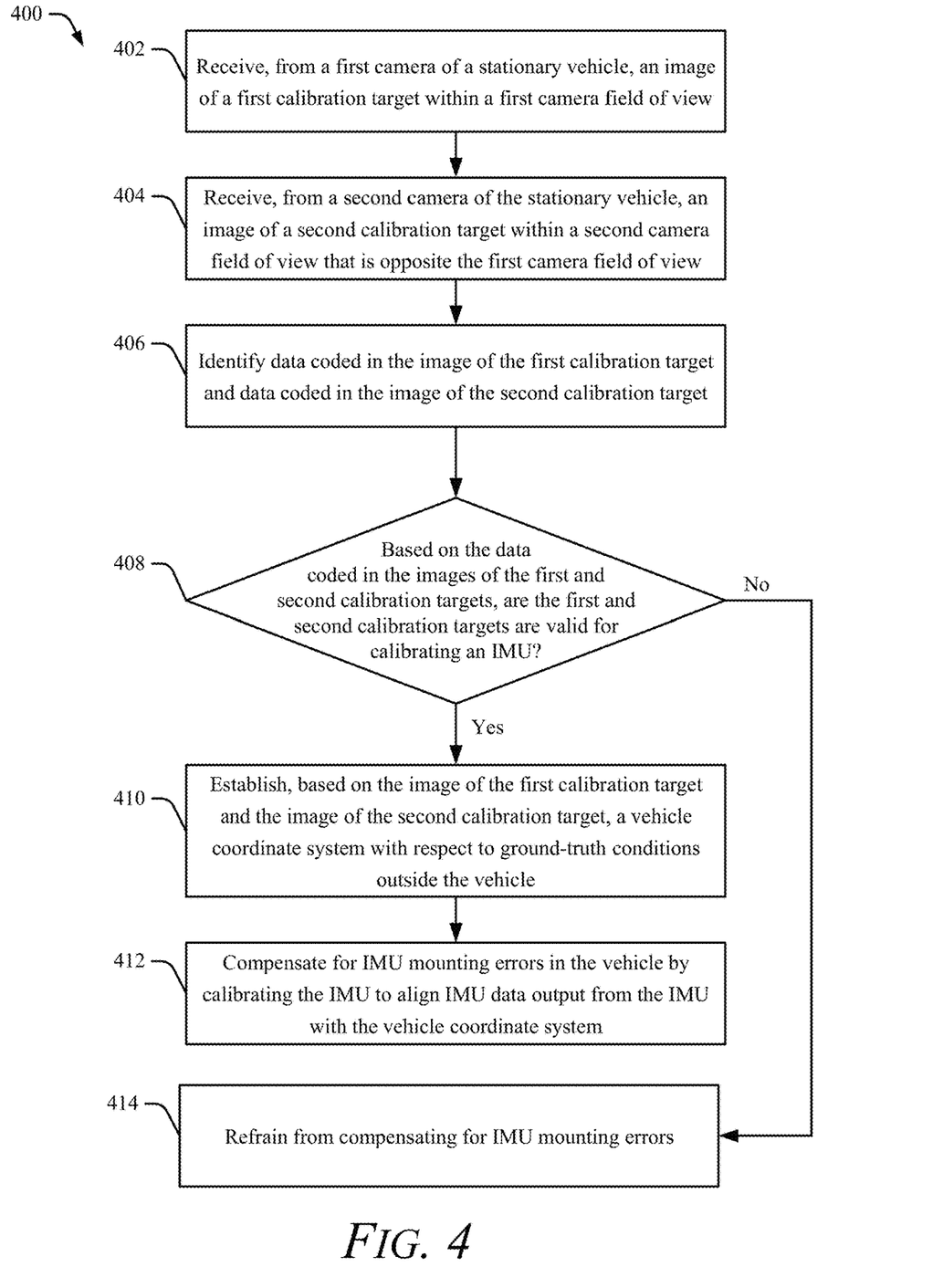
FIG. 4 illustrates a flow diagram of an example process for performing secure camera based IMU calibration for stationary systems.

FIG. 4 illustrates a flow diagram of an example process 400 for performing secure camera based IMU calibration for stationary systems. For ease of description, the process 400 is described primarily in the context of being performed by the calibration system 104 using the communication link 116 to exchange information with the vehicle 102, which is parked and stationary in the environment 100.

The processor 202 with access to the CRM 204 can execute instructions to perform the process 400 and executing the calibration components 206 and 206-1, the camera image interface 208, and the IMU data interface 210. Operations (also referred to as steps) of the process 400 are numbered in this example from 402 to 414. However, this numbering does not necessarily imply a specific order of operations. The steps of the process 400 may be rearranged, skipped, repeated, or performed in different ways than the specific way it is shown in the diagram of FIG. 4.

At 402, an image of a first calibration target within a first camera field of view is received from a first camera of a stationary vehicle. At 404, an image of a second calibration target within a second camera field of view that is opposite the first camera field of view is received from a second camera of the stationary vehicle. For example, the calibration system 104 can select at least one pair of cameras from the vehicle 102 to calibrate the IMU 106. The calibration system 104 selects the camera 108-1, which is front facing, and has the calibration target 118-1 within the field of view 120-1. To pair with the camera 108-1 for performing IMU calibration, the calibration system selects the camera 108-2 that is rear facing and has the calibration target 118-1 within the field of view 120-2, which is opposite the field of view 120-1.

In some cases, more than two calibration targets 118 and/or more than two cameras of the camera system 108 are used. With a minimum of two images employed, and preferably three images for discerning both slope and bank angles, the vehicle coordinate system 304 can be accurately determined. For example, at 402, an image of a third calibration target within the first camera field of view may be received by the processor 202. An image of the third calibration target or a fourth calibration target within the second camera field of view may be received by the processor 202. Using two, three, or even more images of calibration targets can cause the vehicle coordinate system 304 to be computed with a higher degree of precision and/or a higher degree of confidence because of the additional alignment reference indicators and encoded data available from the additional camera images.

At 406, data encoded in the image of the first calibration target and data encoded in the image of the second calibration target is identified. For example, the calibration system 104 communicates over the communication link 116 to cause the vehicle 102 to control the camera system 108 to capture the camera images 112. Within the camera images 112 captured by the cameras 108-1 and 108-2, the calibration system 104 identifies features within optical patterns of the calibration targets 118-1 and 118-2, which include encoded data used for determining the vehicle coordinate system 304.

For example, the camera 108-1 may have a first viewing angle to the calibration target 118-1, and the camera 108-2 may have a second viewing angle to the calibration target 118-2. Depending on the viewing angle used for the calibration targets 118-1 and 118-2, the optical pattern appears different in the camera images 112. The first and second viewing angles can be the same or different. In either case, the first and second viewing angles are set by the calibration system 104 to precise angles that cause a unique, respective optical pattern in the camera images 112. By setting the viewing angles to precise angles, spoofing of calibration targets and the calibration system 104 is prevented, and a precise vehicle coordinate system can be inferred as a frame of reference for calibrating the IMU 106.

At 408, based on data encoded in the image of the first calibration target and data encoded in the image of the second calibration target, whether the first and second calibration targets are valid for calibrating an IMU of the stationary vehicle is determined. For example, the calibration system 104 compares the respective optical pattern at each of the calibration targets 118-1 and 118-2 with a corresponding expected pattern for that particular calibration target to determine whether that particular calibration target is valid for calibrating the IMU. If the calibration targets 118-1 and 118-2 are not precisely positioned near the cameras 108-1 and 108-2, with precise viewing angles applied, the optical patterns within the camera images 112 may not include recognizable features that can be used to determine the vehicle coordinate system.

Within the camera images 112, the encoded data may indicate a make, model, serial number, vehicle identification number, or other identifier of the vehicle 102 and the IMU 106 being calibrated. If the encoded data within the camera images 112 is not validated by the calibration system 104 as being authentic, then the IMU 106 is not re-calibrated. For example, if at 408, it is determined that the first and second calibration targets are valid for calibrating the IMU, then the YES branch is taken and the process 400 continues to step 410. Otherwise, if it is determined that the first and second calibration targets are not valid for calibrating the IMU, then the NO branch is taken and the process 400 continues to step 414. Calibration of the IMU 106 can be conditioned like this, e.g., based on whether the information received from the controller of the vehicle 102 satisfies entry conditions for IMU calibration, in one or more ways.

The computer hardware of the vehicle 102 sends information to the calibration system 104 that indicates whether the vehicle 102 is in a state that is acceptable for IMU calibration. When in the environment 100, the vehicle 102 is in a controlled environment where the vehicle 102 can be placed in a special programming mode, which cannot be accessed from outside the environment 100 or without using special equipment, such as the calibration system 104. Information about the vehicle conditions (e.g., whether the vehicle 102 is a parked state, whether the controller and or the vehicle 102 is in programming mode, whether the vehicle 102 is in the environment 100) can indicate to the calibration system 104 whether the IMU 106 is safe to calibrate. The calibration system 104 is authorized when the information satisfies entry conditions for IMU calibration. This way, the calibration system 104 refrains from generating the IMU calibration data 110 for calibrating the IMU 106, unless it is absolutely safe to do so. Based on the information received from the controller of the vehicle 102, and responsive to authorizing calibration of the IMU 106, the IMU 106 can be calibrated to align the IMU data output from the IMU 106 with the vehicle coordinate system 304.

At 410, based on the image of the first calibration target and the image of the second calibration target, a vehicle coordinate system with respect to ground-truth conditions outside the vehicle is determined. For example, a first relative rotation $R_g^m$ between the IMU coordinate system 302 and the ground-truth conditions 306 is computed, in addition to a second relative rotation $R_g^v$ between the vehicle coordinate system 304 and the ground-truth conditions 306. Based on the first relative rotation $R_g^m$ and the second relative rotation $R_g^v$, a third relative rotation $R_m^v$ between the vehicle coordinate system 304 and the IMU coordinate system 302 is computed, which provides a direct relationship between the IMU 106 and the vehicle frame of reference, regardless of deviations in each with respect to the ground-truth conditions 306. The vehicle frame of reference, i.e., the vehicle coordinate system 304, is related to the vehicle chassis (e.g., the vehicle frame). Therefore, the vehicle coordinate system 304 is independent of changes in vehicle part positions due to variable suspensions, uneven tire inflations, variable torquing, or other variables that do not cause relative mounting errors between the IMU 106 and the vehicle chassis and the vehicle coordinate system 304. A relative rotation between axis of the IMU coordinate system 302 and the vehicle coordinate system 304 is computed to generate the IMU calibration data 110, which when applied by the vehicle 102 to the parameters of the IMU 106, causes IMU data to be output aligned to the vehicle coordinate system 304, regardless of mounting errors in the installation of the IMU 106.

At 412, information is output to enable the stationary vehicle to calibrate the IMU to align IMU data output from the IMU with the vehicle coordinate system by compensating for IMU mounting errors in the vehicle. For example, the calibration system 104 is configured to output information to the vehicle 102. The information output includes the IMU calibration data 110, which is transmitted from the calibration system 104 to the vehicle 102 where the computer hardware of the vehicle 102 adjusts the IMU 106 to be rotationally aligned with the vehicle coordinate system 304. This way, IMU data output from the IMU 106 during operation of the vehicle 102 is compensated to be aligned to the vehicle coordinate system 304, which allows functions of the vehicle 102 to use the IMU data directly, with confidence that it is free from errors. This is true even if the IMU 106 is mounted outside tolerances specified for mounting the IMU 106 to a PCB assembly of the vehicle 102.

FURTHER EXAMPLES

Some additional examples for secure camera based IMU calibration for stationary systems are provided below.

Example 1: A method comprising: receiving, from a first camera of a stationary vehicle, an image of a first calibration target within a first camera field of view of the first camera; receiving, from a second camera of the stationary vehicle, an image of a second calibration target within a second camera field of view of the second camera, the second camera field of view being opposite the first camera field of view; determining, based on encoded data in the image of the first calibration target and encoded data in the image of the second calibration target, whether the first and second calibration targets are valid for calibrating an inertial measurement unit (IMU) of the stationary vehicle; responsive to determining that the first and second calibration targets are valid for calibrating the IMU, establishing, based on the image of the first calibration target and the image of the second calibration target, a vehicle coordinate system with respect to ground-truth conditions outside the vehicle; and outputting information to enable the stationary vehicle to compensate for IMU mounting errors in the vehicle by calibrating the IMU to align IMU data output from the IMU with the vehicle coordinate system.

Example 2: The method of any previous example, wherein the first camera comprises a front facing camera of the vehicle and the second camera comprises a rear facing camera of the vehicle.

Example 3: The method of any previous example, wherein the first camera comprises a first side facing camera of the vehicle and the second camera comprises an opposite side facing camera of the vehicle.

Example 4: The method of any previous example, wherein the first camera comprises a first corner front facing camera of the vehicle and the second camera comprises an opposite corner rear facing camera of the vehicle.

Example 5: The method of any previous example, further comprising: receiving, from a third camera of the stationary vehicle, an image of a third calibration target within a third camera field of view; receiving, from a fourth camera of the stationary vehicle, an image of a fourth calibration target within a fourth camera field of view that is opposite the third camera field of view; determining, based on encoded data in the image of the third calibration target and encoded data in the image of the fourth calibration target, whether the third and fourth calibration targets are valid for calibrating the IMU; and responsive to determining that the third and fourth calibration targets are valid for calibrating the IMU, establishing the vehicle coordinate system based further on the image of the third calibration target and the image of the fourth calibration target.

Example 6: The method of any previous example, wherein calibrating the IMU to align the IMU data output from the IMU with the vehicle coordinate system comprises: receiving, from a controller of the stationary vehicle, information indicating that the stationary vehicle is parked in a controlled calibration environment; authorizing calibration of the IMU based on the information received from the controller; and responsive to authorizing calibration of the IMU, calibrating the IMU to align the IMU data output from the IMU with the vehicle coordinate system.

Example 7: The method of any previous example, wherein the first camera has a first viewing angle to the first calibration target, and the second camera has a second viewing angle to the second calibration target, the method further comprising: setting the first and second viewing angles to precise angles that cause a unique, respective optical pattern including encoded data at each of the first and second calibration targets; and comparing the respective optical pattern at each of the first and second calibration targets with a corresponding expected pattern for that particular calibration target to determine whether that particular calibration target is valid for calibrating the IMU.

Example 8: The method of any previous example, wherein the first and second calibration targets comprise respective screens that display the first and second calibration targets.

Example 9: The method of example 8, further comprising: outputting, for display on a respective screen of the first calibration target, a first optical pattern including the encoded data that appears in the image of the first calibration target; and outputting, for display on a respective screen of the second calibration target, a second optical pattern including the encoded data that appears in the image of the second calibration target.

Example 10: The method of any previous example, further comprising: obtaining a relative separation height between the first camera and the second camera; and selecting, from among multiple different cameras of the vehicle, the first camera and the second camera to use for calibrating the IMU based on whether the relative separation height between the first camera and the second camera satisfies a height threshold.

Example 11: The method of any previous example, further comprising: obtaining a relative separation distance between the first camera and the second camera; and selecting the first camera and the second camera to use for calibrating the IMU based further on whether the relative separation distance between the first camera and the second camera satisfies a distance threshold for correcting errors in mounting angle of the IMU relative the stationary vehicle.

Example 12: The method of any previous example, wherein outputting information to enable the stationary vehicle to calibrate the IMU to align the IMU data output from the IMU with the vehicle coordinate system comprises sending information to the stationary vehicle for compensating the IMU data for relative rotation between the vehicle coordinate system and a coordinate system of the IMU.

Example 13: The method of any previous example, wherein the IMU data is output from the IMU for executing functions of the stationary vehicle that act on the IMU data after the IMU data is aligned to the vehicle coordinate system and compensated for the IMU mounting errors in the vehicle.

Example 14: A system comprising a processor configured to perform the method of any previous example.

Example 15: A computer-readable storage media comprising instructions that, when executed, cause a processor to perform the method of any previous example.

Example 16: A system comprising means for performing the method of any previous example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to vehicle systems, problems associated with IMU mounting alignments can occur in other systems, not only vehicles. Therefore, although described to improve IMU alignment for vehicles, the techniques of the foregoing description can be adapted and applied to other problems to effectively calibrate an IMU to be aligned with a body coordinate system of other objects, apparatuses, and systems.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

We claim:

1. A method comprising:
obtaining a relative separation height between pairs of different cameras of a stationary vehicle;
selecting, from among the pairs of different cameras of the stationary vehicle, a first camera and a second camera to use for calibrating an inertial measurement unit (IMU) of the stationary vehicle based on whether the relative separation height satisfies a height threshold;
receiving, from the first camera an image of a first calibration target within a first camera field of view of the first camera;
receiving, from the second camera an image of a second calibration target within a second camera field of view of the second camera, the second camera field of view being opposite the first camera field of view;
determining, based on encoded data in the image of the first calibration target and encoded data in the image of the second calibration target, whether the first and second calibration targets are valid for calibrating the IMU of the stationary vehicle;
responsive to determining that the first and second calibration targets are valid for calibrating the IMU, establishing, based on the image of the first calibration target and the image of the second calibration target, a vehicle coordinate system with respect to ground-truth conditions outside the vehicle; and
outputting information to enable the stationary vehicle to compensate for IMU mounting errors in the vehicle by calibrating the IMU to align IMU data output from the IMU with the vehicle coordinate system.

2. The method of claim 1, wherein the first camera comprises a front facing camera of the vehicle and the second camera comprises a rear facing camera of the vehicle.

3. The method of claim 1, wherein the first camera comprises a first side facing camera of the vehicle and the second camera comprises an opposite side facing camera of the vehicle.

4. The method of claim 1, wherein the first camera comprises a first corner front facing camera of the vehicle and the second camera comprises an opposite corner rear facing camera of the vehicle.

5. The method of claim 1, further comprising:
receiving, from a third camera of the stationary vehicle, an image of a third calibration target within a third camera field of view;
receiving, from a fourth camera of the stationary vehicle, an image of a fourth calibration target within a fourth camera field of view that is opposite the third camera field of view;
determining, based on encoded data in the image of the third calibration target and encoded data in the image of the fourth calibration target, whether the third and fourth calibration targets are valid for calibrating the IMU; and
responsive to determining that the third and fourth calibration targets are valid for calibrating the IMU, establishing the vehicle coordinate system based further on the image of the third calibration target and the image of the fourth calibration target.

6. The method of claim 1, wherein calibrating the IMU to align the IMU data output from the IMU with the vehicle coordinate system comprises:
receiving, from a controller of the stationary vehicle, information indicating that the stationary vehicle is parked in a controlled calibration environment;

authorizing calibration of the IMU based on the information received from the controller; and
responsive to authorizing calibration of the IMU, calibrating the IMU to align the IMU data output from the IMU with the vehicle coordinate system.

7. The method of claim 1, wherein:
the first camera has a first viewing angle relative to the first calibration target;
the second camera has a second viewing angle relative to the second calibration target; and
the method further comprises:
  setting the first and second viewing angles to precise angles that cause a respective unique optical pattern including encoded data at each of the first and second calibration targets; and
  comparing the respective optical pattern at each of the first and second calibration targets with a corresponding expected pattern for that particular calibration target to determine whether that particular calibration target is valid for calibrating the IMU.

8. The method of claim 1, wherein the first and second calibration targets comprise respective screens that display the first and second calibration targets.

9. The method of claim 8, further comprising:
outputting, for display on a respective screen of the first calibration target, a first optical pattern including the encoded data that appears in the image of the first calibration target; and
outputting, for display on a respective screen of the second calibration target, a second optical pattern including the encoded data that appears in the image of the second calibration target.

10. The method of claim 1, wherein outputting information to enable the stationary vehicle to calibrate the IMU to align the IMU data output from the IMU with the vehicle coordinate system comprises sending information to the stationary vehicle for compensating the IMU data for relative rotation between the vehicle coordinate system and a coordinate system of the IMU.

11. The method of claim 1, wherein the IMU data is output from the IMU for executing functions of the stationary vehicle that act on the IMU data after the IMU data is aligned to the vehicle coordinate system and compensated for the IMU mounting errors in the vehicle.

12. A system comprising a processor configured to:
obtaining a relative separation height between pairs of different cameras of a stationary vehicle;
select, from among the pairs of different cameras of the stationary vehicle, a first camera and a second camera to use for calibrating an inertial measurement unit (IMU) of the stationary vehicle based on whether the relative separation height satisfies a height threshold;
receiving, from the first camera an image of a first calibration target within a first camera field of view of the first camera;
receive, from the second camera of the stationary vehicle, an image of a second calibration target within a second camera field of view of the second camera, the second camera field of view being opposite the first camera field of view;
determining, based on encoded data in the image of the first calibration target and encoded data in the image of the second calibration target, whether the first and second calibration targets are valid for calibrating the IMU of the stationary vehicle;
responsive to determining that the first and second calibration targets are valid for calibrating the IMU, establishing, based on the image of the first calibration target and the image of the second calibration target, a vehicle coordinate system with respect to ground-truth conditions outside the vehicle; and
outputting information to enable the stationary vehicle to compensate for IMU mounting errors in the vehicle by calibrating the IMU to align IMU data output from the IMU with the vehicle coordinate system.

13. The system of claim 12, wherein the first camera comprises a front facing camera of the vehicle and the second camera comprises a rear facing camera of the vehicle.

14. The system of claim 12, wherein the first camera comprises a first side facing camera of the vehicle and the second camera comprises an opposite side facing camera of the vehicle.

15. The system of claim 12, wherein the first camera comprises a first corner front facing camera of the vehicle and the second camera comprises an opposite corner rear facing camera of the vehicle.

16. The system of claim 12, wherein the processor is further configured to display the first and second calibration targets on respective screens.

17. The system of claim 16, wherein the processor is further configured to:
output, for display on a respective screen of the first calibration target, a first optical pattern including the encoded data that appears in the image of the first calibration target; and
output, for display on a respective screen of the second calibration target, a second optical pattern including the encoded data that appears in the image of the second calibration target.

18. A non-transitory computer-readable storage media comprising instructions that, when executed, cause a processor to:
obtaining a relative separation height between pairs of different cameras of a stationary vehicle;
select, from among the pairs of different cameras of the stationary vehicle, a first camera and a second camera to use for calibrating an inertial measurement unit (IMU) of the stationary vehicle based on whether the relative separation height satisfies a height threshold;
receive, from the first camera an image of a first calibration target within a first camera field of view of the first camera;
receive, from the second camera an image of a second calibration target within a second camera field of view of the second camera, the second camera field of view being opposite the first camera field of view;
determining, based on encoded data in the image of the first calibration target and encoded data in the image of the second calibration target, whether the first and second calibration targets are valid for calibrating the IMU of the stationary vehicle;
responsive to determining that the first and second calibration targets are valid for calibrating the IMU, establishing, based on the image of the first calibration target and the image of the second calibration target, a vehicle coordinate system with respect to ground-truth conditions outside the vehicle; and
outputting information to enable the stationary vehicle to compensate for IMU mounting errors in the vehicle by calibrating the IMU to align IMU data output from the IMU with the vehicle coordinate system.

19. The method of claim 1, wherein the encoded data includes an embedded public key, and the determining whether the first and second calibration targets are valid includes performing authentication using the embedded public key.

20. The system of claim 12, wherein the encoded data includes an embedded public key, and the processor is configured to determine whether the first and second calibration targets are valid by performing authentication using the embedded public key.

* * * * *

UNITED STATES PATENT AND TRADEMARK OFFICE
CERTIFICATE OF CORRECTION

| | | |
|---|---|---|
| PATENT NO. | : 12,254,647 B2 | Page 1 of 1 |
| APPLICATION NO. | : 17/660242 | |
| DATED | : March 18, 2025 | |
| INVENTOR(S) | : Christopher David Ruppel et al. | |

It is certified that error appears in the above-identified patent and that said Letters Patent is hereby corrected as shown below:

In the Claims

Column 16, Line 10: In Claim 1, after "camera", insert --,--
Column 16, Line 13: In Claim 1, after "camera", insert --,--
Column 17, Line 48: In Claim 12, delete "select," and insert --selecting,--
Column 17, Line 53: In Claim 12, after "camera", insert --,--
Column 17, Line 56: In Claim 12, delete "receive," and insert --receiving,--
Column 18, Line 39: In Claim 18, delete "select," and insert --selecting,--
Column 18, Line 44: In Claim 18, delete "receive," and insert --receiving,--
Column 18, Line 44: In Claim 18, after "camera", insert --,--
Column 18, Line 47: In Claim 18, delete "receive," and insert --receiving,--
Column 18, Line 47: In Claim 18, after "camera", insert --,--

Signed and Sealed this
Thirteenth Day of May, 2025

Coke Morgan Stewart
*Acting Director of the United States Patent and Trademark Office*